Oct. 4, 1966    B. BARNABAS    3,276,149
DEXTERITY TESTING APPARATUS
Filed April 20, 1964
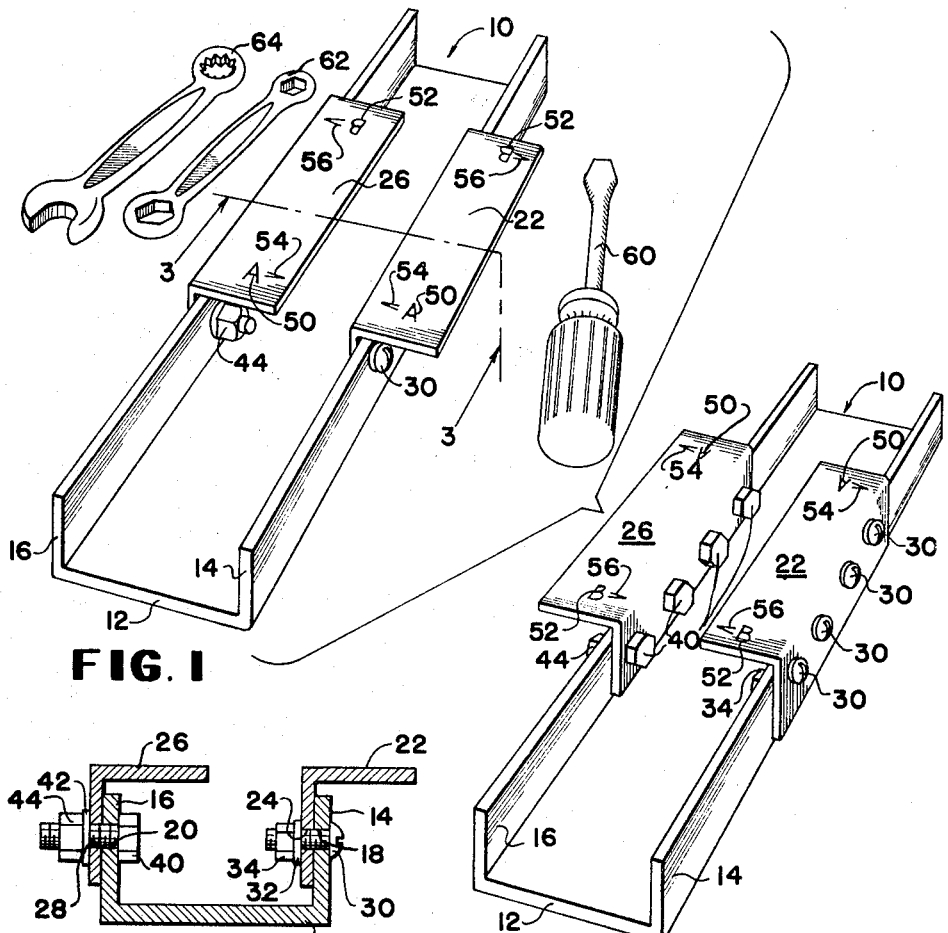
FIG. 1
FIG. 3
FIG. 2
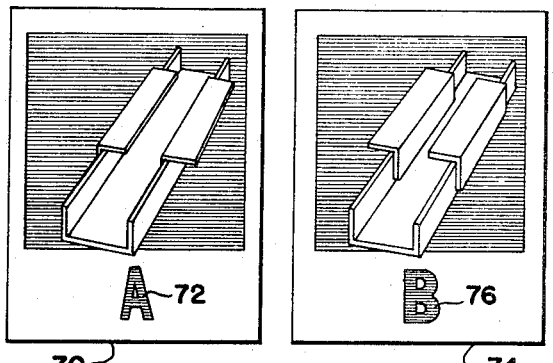
FIG. 4
*INVENTOR.*
BENTLEY BARNABAS
BY *John H. Widdowson*
ATTORNEY

United States Patent Office 3,276,149
Patented Oct. 4, 1966

3,276,149
DEXTERITY TESTING APPARATUS
Bentley Barnabas, 815 Beacon Bldg., Wichita, Kans.
Filed Apr. 20, 1964, Ser. No. 361,009
4 Claims. (Cl. 35—22)

This invention relates to testing, more particularly to testing of manual dexterity. More specifically this invention relates to an apparatus for testing manual dexterity. The invention relates to a testing apparatus particularly useful in appraising the manual dexterity aptitude of persons aspiring to be mechanics, mechanic helpers, and the like.

Devices to test manipulation aptitude are known in the art. These apparatus are in general adapted to measure only a very specific aspect of manual dexterity, as for example, use of the index finger and thumb for positioning small pieces. An example of such a testing apparatus is a device in which a plurality of nuts are assembled on a plurality of upstanding bolts. The rate of assembly of the nuts and bolts is then used as a measure of aptitude. These known aptitude tests, though useful, fail to measure associated and important aptitudes such as ability to reconstruct a dissimilar set of elements, ability to manipulate items in constricted places, ability to manipulate items without visually observing them, ability to quickly judge the most efficient manner for assembling and disassembling a set of dissimilar items, and ability to handle hand tools efficiently.

Usually in testing projects it is desirable to test a large number of people without expending an inordinate amount of time. In testing apparatus known to the prior art the apparatus usually had to be prepared prior to its use. As for example, if the apparatus is assembled during the test it necessarily needed to be disassembled before it could be used again in a subsequent test. This results in an excessive expenditure of time both by the persons being tested and/or the one giving the test.

Further the testing apparatus known to the prior art are often expensive and consist of many parts that may become lost, misplaced, or pilfered. These apparatus in general require considerable capital investment and are expensive and troublesome to maintain.

I have invented a new dexterity testing means. The dexterity testing means of my invention has a base element having spaced openings therein. A detachable element is provided that is adapted to be affixed to one portion of the base element, the detachable element has spaced openings therein alignable with the spaced openings in the portion of the base element. Fastening means are provided which are adapted to be inserted through the spaced openings in the base element and the spaced openings in the detachable element which provide a means for detachably securing same together. The testing means in use is adapted to be assembled and/or disassembled by one being tested and the total elapsed time thereof used as a measure of manual dexterity of the person being tested.

The testing apparatus of my invention solves all of the problems associated with testing apparatus known to the prior art. My new testing apparatus when used in the manner prescribed serves as a measure of the overall manual dexterity of the person being tested. The testing apparatus in addition to measuring the person's ability to manipulate small articles with the index finger and thumb, takes into account other important associated manual dexterity aspects. In my testing apparatus the person being tested must display an ability to reconstruct a dissimilar set of elements, manipulate small items in constricted places, manipulate items without visually observing them, quickly judge the most efficient manner of assembling and disassembling dissimilar items, and display an ability to quickly select and use hand tools, in order to obtain a favorable rating. The exercise presented with my testing apparatus involves all of the aforementioned skills and abilities which are in combination a true measure of the manual dexterity.

Another important feature of my testing apparatus is that it is efficient to use in terms of time and effort as will be hereinafter explained in detail. The composite elements of the apparatus during the test exercise are disassembled and then reassembled in a different relationship by the person being tested. Immediately after the test apparatus has been assembled correctly it is in proper order for the next test exercise. One subsequently taking the test exercise must completely disassemble and then reassemble in a new relationship of elements which relationship is similar to the initial one as presented to the previous person. While there are two correct alternate relationships of elements possible the test exercise can be given regardless of which relationship the elements happen to be. There is no need to assemble or disassemble the test apparatus after it has been used, as is the case with many prior art testing apparatus.

Further, the test apparatus of my invention is relatively inexpensive and is composed of a minimum number of elements. This reduces the initial capital investment, and also reduces the cost and expense of maintaining it.

An object of this invention is to provide a new dexterity testing apparatus.

Still another object of this invention is to provide a new manual dexterity testing apparatus that involves a large and varied range of abilities and skills during the test exercise it presents.

Yet another object of this invention is to provide a testing apparatus that will give a relatively accurate indication of the manual dexterity of the person being tested.

Another object of this invention is to provide a testing apparatus that does not require a time consuming preparation before it is ready for use.

Another object of the invention is to provide a manual dexterity testing apparatus that can be used to give a comprehenisve test that is of relatively short time duration.

Yet another object of this invention is to provide a testing apparatus for determining the manual dexterity of a person being tested that is particularly adapted to determine his manual dexterity with respect to mechanical work.

Another object of this invention is to provide a test apparatus that is relatively inexpensive to purchase and maintain.

Still another object of this invention is to provide a manual dexterity testing apparatus that is rugged in construction.

Other objects and advantages of the new testing apparatus of my invention will become apparent to those skilled in the art upon reading the disclosure.

Drawings accompany and are a part of this disclosure. These drawings depict preferred specific embodiments of the new testing apparatus of my invention, and it is to be understood that such drawings are not to unduly limit the scope of my invention. In the drawings, FIG. 1 is a perspective view of a specific embodiment of the manual dexterity testing apparatus of my invention, illustrating the composite elements in a first relationship.

FIG. 2 is a perspective view of my testing apparatus, illustrating the composite elements in a second alternative relationship.

FIG. 3 is a cross sectional view taken on line 3—3 of FIG. 1.

FIG. 4 is front and rear view of an instruction card used to indicate the various alternative relationships of the elements of my testing apparatus to one taking the test.

The following is a discussion and description of the new dexterity testing apparatus of my invention made with reference to the drawings, wherein the same reference numerals are used to indicate the same or similar parts and/or structure. The discussion and description is of preferred specific embodiments of the new dexterity testing apparatus of my invention, and it is to be understood that such is not to unduly limit the scope of my invention.

Referring now to the drawings, FIGS. 1 through 4, there is illustrated dexterity testing apparatus 10, a preferred specific embodiment of my invention. The manual dexterity aptitude testing apparatus 10 has a base element 12, consisting of a length of aluminum channel stock having a U-shaped cross section. The base 12 can be made of any suitable material however. The channel stock provides two upstanding legs 14 and 16. Leg 14 is provided with a set of four relatively small longitudinally and evenly spaced apertures 18. Leg 16 is provided with a set of four relatively large longitudinally and evenly spaced apertures 20. Preferably, apertures 18 and 20 are positioned across from each other in the base element 12. A first length of aluminum stock 22, provided with four relatively small longitudinally and evenly spaced apertures 24, is mounted on leg 14 of base 12. The apertures 24 in the length of channel stock 22 are of the same size and spacing as the apertures in leg 14. A second length of aluminum stock 26 is provided having a set of four relatively large longitudinally and evenly spaced apertures 28 therein. Any suitable number of apertures can be provided however. The apertures 28 on the angle stock 26 are adapted to be positioned in alignment with the apertures 20 in leg 16 of base 12. A first set of four relatively small bolts 30, each provided with a lock washer 32 and a nut 34, are used to secure the length of angle stock 22 to the upstanding leg 14 of base 12. A set of four relatively large bolts 40 is provided to secure the length of channel stock 26 to the upstanding leg 16 of base 12. Each of bolts 40 is provided with a lock washer 42 and a nut 44. As indicated in FIGS. 1 and 2, the lengths of angle stock 22 and 26 can be affixed to the upstanding legs 14 and 16 of base 12 in either of two alternative position relationships. As can be seen, the lengths of angle stock and the base 12 combine to form a constricted area about the bolts. One manipulating the bolts and nuts is forced to substantially do so by feel, unaided by visual observation. The structure provides a means of testing the facility of working by touch, and also other abilities, as for example efficient handling and selection of tools, etc.

In order to more clearly indicate the relative positions of the lengths of angle stock 22 and 26, and the base 12, indicia means are provided. A first indicia 50 and second indicia 52 are provided on the outside top surface of the length of angle stock 22, adjacent each end. Similar first and second indicia 50 and 52 are also placed on the outside surface of the length of angle stock 26, adjacent each end thereof. First direction indicia 54 are provided that are associated with the first indicia 50 on the lengths of angle stock 22 and 26. Direction indicia 54 are positioned on the lengths of angle stock so that they point toward each other when the angle stocks 22 and 26 are affixed to the channel stock in one position, as for example in FIG. 1, and away from each other when the relative position of the angle stocks and base 12 is reversed, as for example in FIG. 2. Second direction indicating indicia 56 are provided, which are associated with the second indicia 52 on the lengths of channel stock 22 and 26. The second direction indicating indicia 56 are positioned to point in the opposite direction relative to direction indicating indicia 54. Hand tool means are provided for applying torque to the sets of bolts and nuts used to secure the lengths of angle stock to the upstanding legs of base 12. The hand tools are a screw driver 60, and wrenches 62 and 64. Any suitable number and type of tools can be provided. The type of tool means to be provided is dependent on the type and sizes of bolt means and nuts used to secure the various elements of the test device in assembled relation.

A suitable illustration card having depicted thereon illustrations of the lengths of angle stock 22 and 26 and base 12 in alternative assembled position relation is provided. The alternative views 70 and 74 can be labeled A and B as illustrated in FIG. 4. The view 70 is identified by the indicia 72, and the view 74 is identified by the indicia 76. Preferably the views are on opposite sides of the same card, which is desirably of relatively heavy cardboard construction. The views illustrated in 70 and 74 should desirably clearly indicate the relationship of indicia 50, and 52 and the direction indicating indicia 54 and 56. Also the positions of the bolts and nuts should be clearly illustrated, as for example as illustrated in detail in FIGS. 1 and 2.

The testing apparatus 10 of my invention is adapted in use to be disassembled by one taking a test and reassembled with the direction indicating indicia in reversed relationship and the elapsed time of assembly and disassembly used as a measure of manual dexterity. The dexterity testing apparatus 10 of my invention and suitable tools are placed in front of the person being about to be tested on a smooth surface. Preferably the surface is one on which the nuts or bolts will not roll or bounce. The apparatus 10 is first checked to see in what position the indicia are displayed. The illustration card is then placed before the person being tested with the side displayed that depicts an opposite alternative position relationship of the composite elements than the actual position relationship as presented. The person is then instructed that he is to disassemble the elements and reassemble them to place the apparatus in the relationship depicted on the card being displayed to him. The person is then told to start and to work as rapidly as possible. When he has completed the disassembly and assembly he is instructed to hold up his hand. The time of disassembly and assembly is noted and compared to a chart. The elapsed time will rate the person as to manual dexterity displayed during the test exercise. The test can then be given another person by merely turning the card over, assuming that the person previously tested has assembled the apparatus correctly.

As will be obvious to those skilled in the art various changes and modifications of the preferred dexterity testing apparatus of my invention can be made or followed without departing from the spirit of the disclosure or from the scope of the claims.

I claim:

1. A manual dexterity aptitude testing apparatus comprising, in combination, a base element comprising a length of aluminum channel stock having a U-shaped cross section providing two upstanding legs, said channel stock having a first set of four relatively small longitudinally and evenly spaced holes in a first upstanding leg, and a second set of four relatively large longitudinally and evenly spaced holes in the other upstanding second leg positioned across from said first set of relatively small holes, a first length of aluminum angle stock having four relatively small longitudinally and evenly spaced holes therein, said holes being the same size and having the same spacing as said first set of relatively small holes in said first leg of said channel stock, a second length of aluminum angle stock having four relatively large longitudinally and evenly spaced holes therein, said holes being of the same size and having the same spacing as said second set of relatively large holes in said second leg of said channel stock, a first set of four relatively small bolts each having a diameter slightly less than said relatively small holes in said first leg of said channel stock, for securing said first length of angle stock to said first leg of said channel stock, four lock washers for said first set of bolts, four nuts for said first set of bolts, a second set of four relatively large bolts, each having a diameter slightly less than said relatively large holes in said second leg of said channel stock, for securing said second length of angle stock to said second leg of said channel stock, four lock washers for said second set of bolts, four nuts for said second set of bolts, a first and a second indicia on the outside surface of said first length of angle stock adjacent each end, first and second indicia on the outside surface of said second length of angle stock adjacent each end, first direction indicating indicia associated with said first indicia on said first and said second lengths of angle stock positioned to point toward each when said angle stocks are fixed to said channel stock in one position, and away from each other when the relative position of the angle stocks and base is reversed, second direction indicating indicia associated with said second indicia on said first and second lengths of angle stock positioned to point in opposite directions relative to said first direction indicating indicia, hand tool means for applying torque to said first and second sets of bolts and nuts, and an illustration card having depicted on opposite sides thereof illustrations of the channel stock and first and second angle stock in alternative assembled positions and clearly depicting the indicia, said testing apparatus adapted in use to be disassembled by one taking the test and reassembled with the direction indicating indicia in a reversed relationship, and the elapsed time of the disassembled and assembled measured, and used as a measure of the degree of manual dexterity.

2. A manual dexterity testing apparatus comprising, in combination, a base element, said base element comprised of a length of channel stock providing two upstanding legs, said channel stock having a plurality of relatively small longitudinally spaced apertures in the first leg, and a plurality of relatively large longitudinally spaced apertures in the other upstanding second leg, a first length of angle stock having a plurality of relatively small longitudinally spaced apertures therein, said apertures being the same size and having the same spacing as said plurality of relatively small holes in said first leg of said channel stock, a second length of angle stock having a plurality of relatively large longitudinally spaced apertures therein, said apertures being of the same size and having the same spacing as said plurality of relatively large apertures in said second leg of said channel stock, a first set of relatively small bolts for securing said first length of angle stock to said first leg of said channel stock, each of said bolts having a diameter slightly less than said relatively small apertures in said channel stock, a second set of relatively large bolts for securing said second length of angle stock to said second leg of said channel stock, each of said bolts having a diameter slightly less than said relatively large holes in said channel stock, first and second indicia on the outside surface of said first length of angle stock, first and second indicia on the outside surface of said second length of angle stock, first direction indicating indicia associated with said first indicia on said first and second lengths of angle stock positioned to point toward each other when said angle stocks are fixed to said channel stock in one position, and away from each other when the relative position of the angle stock and base is reversed, said direction indicating indicia associated with said second indicia on said first and second lengths of angle stock positioned to point in opposite directions to said first indicating indicia, hand tool means for applying torque to said first and second sets of bolts, illustration means depicting alternative assembled positions of said first and second angle stock and said base, said testing means adapted in use to be disassembled and assembled by one being tested and the total elapsed time thereof used as a measure of manual dexterity.

3. A manual dexterity testing apparatus comprising, in combination a base element, said base element, comprised of a length of channel stock having two upstanding legs, said channel stock having a plurality of longitudinally spaced holes in each of said legs, a first length of angle stock having a plurality of longitudinally spaced apertures therein, a second length of angle stock having a plurality of longitudinally spaced apertures therein, a first set of bolts for securing said first length of said angle stock to one leg of said channel stock, a second set of bolts for securing said second length of angle stock to the other leg of said channel stock, first and second indicia on the outside surface of said first length of angle stock, first and second indicia on the outside surface of said second length of angle stock, first direction indicating indicia associated with said first indicia on said first and second length of angle stock positioned to point toward each other when said angle stocks are fixed to said channel stock in one direction, and away from each other when the relative position of the angle stock is reversed, second direction indicating indicia associated with said second indicia on said first and second lengths of angle stock positioned to point in opposite directions to first indicating indicia, illustration means depicting alternative assembled positions of said first and second angle stock and said base, said testing mechanism disassembled and assembled by one being tested and the total time elapsed thereof used as a measure of manual dexterity.

4. A manual dexterity testing apparatus comprising, a base having a plurality of spaced upright portions, a plurality of spaced apertures in each of said upright portions, a first element having a plurality of spaced apertures therein, said first element adapted to be affixed on said base with said spaced apertures in alignment with apertures in one of said upright portions of said base, a second element having a plurality of spaced apertures therein, said second element adapted to be fixed to said base with said apertures in alignment with apertures in another of said upright portions, a plurality of fastening means adapted to be positioned in the apertures in the upright portions of said base and said first and second elements to detachably secure same in assembled relation, first and second indicia on the outside surface of said first element, first and second indicia on the outside surface of said second element, said first indicia on said first and second element having associated therewith direction indicating indicia to point toward each other when said elements are affixed to said base in one direction and away from each other when the relative position of the elements is reversed, said second indicia on said first and second elements having associated therewith direction indicating indicia to point in opposite directions to the first-named direction indicating indicia, and illustration means depicting thereon alternative assembled positions of said elements and said base, said testing apparatus disassembled and assembled by one being tested and the total time elasped thereof used as a measure of manual dexterity.

References Cited by the Examiner

UNITED STATES PATENTS 1,804,927  5/1931  Gilbert _____ 46—16
2,034,535  3/1936  Platt.

FOREIGN PATENTS 588,753  12/1959  Canada.
291,095  10/1928  Great Britain.
384,215  12/1932  Great Britain.

EUGENE R. CAPOZIO, *Primary Examiner.*

W. GRIEB, *Assistant Examiner.*